United States Patent
Kokkonen et al.

(10) Patent No.: US 7,242,946 B2
(45) Date of Patent: Jul. 10, 2007

(54) TELECOMMUNICATIONS SYSTEM AND METHOD FOR CONTROLLING PRIVACY

(75) Inventors: Petri Kokkonen, Espoo (FI); Markus Maanoja, Helsinki (FI); Tomi Varonen, Helsinki (FI); Jan Ignatius, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/495,793

(22) PCT Filed: Oct. 9, 2002

(86) PCT No.: PCT/IB02/04400

§ 371 (c)(1),
(2), (4) Date: Sep. 7, 2004

(87) PCT Pub. No.: WO03/045099

PCT Pub. Date: May 30, 2003

(65) Prior Publication Data

US 2005/0014485 A1 Jan. 20, 2005

(30) Foreign Application Priority Data

Nov. 21, 2001 (WO) .................. PCT/IB01/02754
Feb. 13, 2002 (WO) .................. PCT/IB02/01264

(51) Int. Cl.
*H04Q 7/20* (2006.01)
(52) U.S. Cl. ............... 455/456.1; 455/456.2; 455/456.3; 455/457
(58) Field of Classification Search ............ 455/412.1, 455/456.1, 456.2, 456.3, 433, 432.1, 435.1, 455/440, 445, 414.2, 457
See application file for complete search history.

(56) References Cited

U.S. PATENT DOCUMENTS

| 5,493,692 | A | | 2/1996 | Theimer et al. |
| 5,790,665 | A | * | 8/1998 | Micali ................... 705/51 |
| 6,195,557 | B1 | * | 2/2001 | Havinis et al. ......... 455/456.2 |

(Continued)

FOREIGN PATENT DOCUMENTS

EP    1 113 678 A2    7/2001

(Continued)

OTHER PUBLICATIONS

ETSI TS 123 271 V4.3.0 (Oct. 2001) Digital cellular telecommunications system (Phase 2+) (GSM); Universal Mobile Telecommunications System (UMTS); Functional stage 2 description of location services (3GP TS 23.271 version 4.3.0 Release 4).

*Primary Examiner*—Matthew Anderson
*Assistant Examiner*—Tuan Pham
(74) *Attorney, Agent, or Firm*—Squire, Sanders & Dempsey L.L.P.

(57) ABSTRACT

A telecommunications system comprises at least one user and provides a first entity for storing information defining a privacy profile for at least one user. A second entity is arranged to store an association between at least one user and the first entity and the system is such that in response to a request for information relating to the user, the association stored in the second entity is used to identify the first entity so that a check can be made with respect to the privacy profile as to whether or not the requested information can be provided.

32 Claims, 4 Drawing Sheets

U.S. PATENT DOCUMENTS

| | | | |
|---|---|---|---|
| 6,269,244 B1* | 7/2001 | Alperovich et al. | 455/433 |
| 6,311,069 B1 | 10/2001 | Havinis et al. | |
| 6,463,289 B1* | 10/2002 | Havinis et al. | 455/456.4 |
| 6,519,249 B1* | 2/2003 | Bennefeld et al. | 370/352 |
| 2002/0098832 A1* | 7/2002 | Fleischer et al. | 455/414 |
| 2002/0110096 A1* | 8/2002 | Carlsson et al. | 370/328 |
| 2002/0137525 A1* | 9/2002 | Fleischer et al. | 455/456 |
| 2002/0138601 A1* | 9/2002 | Piponius et al. | 709/223 |
| 2002/0154642 A1* | 10/2002 | Higarahim et al. | 370/401 |
| 2002/0160810 A1* | 10/2002 | Glitho et al. | 455/560 |
| 2002/0174363 A1* | 11/2002 | Chefalas et al. | 713/201 |
| 2003/0011511 A1* | 1/2003 | King et al. | 342/357.02 |
| 2003/0074456 A1* | 4/2003 | Yeung et al. | 709/229 |
| 2003/0134648 A1* | 7/2003 | Reed et al. | 455/456 |

FOREIGN PATENT DOCUMENTS

| | | |
|---|---|---|
| WO | WO 99/27746 | 6/1999 |
| WO | WO 01/28273 A1 | 4/2001 |

* cited by examiner

TELECOMMUNICATIONS SYSTEM AND METHOD FOR CONTROLLING PRIVACY

FIELD OF THE INVENTION

The present invention relates to a method for controlling the privacy of a user in a network and to a telecommunications network.

BACKGROUND OF THE INVENTION

Communication systems providing mobility for the users thereof are known. A well known example of the mobile communication systems is the public land line mobile network (PLMN), a cellular communication network being an example of the PLMN. Another example is a mobile communication system that is based, at least partially, on use of communication satellites.

The mobile network apparatus and/or user equipment such as a mobile station can be employed for provision of information regarding the geographical location of the user equipment and thus the user thereof. A mobile user equipment and thus the user thereof can be positioned by various different techniques. For example, substantially accurate geographical location information that associates with a user equipment can be obtained based on the known satellite based GPS (Global Positioning System). More accurate location information can be obtained through a differential GPS.

Another possibility is to use a location service that associates with a cellular telecommunications system for the provision of the location information. In this approach the cells or similar geographically limited radio access entities and associated controllers of the communication system are utilised in production of at least a rough location information estimate concerning the current location of the mobile user equipment. To improve the accuracy of the location information the communication system may be provided with specific location measurement units that provide more accurate data concerning the location of a user equipment within the service area of the cellular system. It is also possible to determine geographical location when the mobile user equipment is located within the coverage area of a visited or "foreign" network. The visited network may be made capable of transmitting the location of the mobile user equipment back to the home network, e.g. to support services that are based on location information or for the purposes of routing and charging.

The location data may be processed in a specific location service entity that is implemented either within the cellular system or connected thereto. The location data may also be processed in the user equipment that is provided with appropriate processing capacity. The location service entity provided by the communication system may serve different clients via an appropriate interface.

The location information may be used for various purposes, such as for location of a mobile telephone that has made an emergency call, for locating vehicles or given mobile subscribers and so on. In general, a client such as user equipment or another entity wishing to receive location information regarding user equipment may send a request for such information to the location service provision entity. The location service provisioning entity will then process the request, obtain the required data and generate an appropriate response.

An example of the provision of location information by a PLMN is described in more detail in 3$^{rd}$ Generation Partnership Project (3GPP) technical specifications, see e.g. 3GPP TS 23.271 version 4.2.0, titled "Functional stage 2 description of LCS", June 2001.

According to the 3GPP specification a location service (LCS) server entity referred to as a Gateway Mobile Location Center (GMLC) is provided for managing the location services. The GMLC is for gathering and storing various data that may be used in the provision of location information for location service clients (LCS clients). The LCS Client may make use of that location information for various services/applications. A possible application comprises a LCS client arranged to provide location information in response to a request for non-call related location information. Such a request for location information is referred to in the 3GPP specifications as a non-call related MT-LR (Mobile Terminated Location Request).

Use of a so called "Authorized UE List" has been proposed. This list contains Mobile Subscriber ISDN (MSISDN) (ISDN—Integrated Services Digital Network) numbers or groups of MSISDNs which are authorised to initiate a location information provision procedure. That is, MSISDNs or groups of MSISDN are listed for which the LCS Client may issue a non-call related MT-LR. Separate lists of MSISDNs may be associated with each distinct external or non-call related client identity. Location information may be provided by the LCS server to the LCS client in response to a request for location information from a user with a MSISDN number that appears in the list.

The LCS Client who is external to the PLMN system may only be enabled to validly issue location information requests for those MSISDNs which are found on the "Authorized UE List". That is, the LCS clients request may only be responded for subscribers who subscribe to the location services provided by the PLMN, as their MSISDNs would not otherwise appear on the list.

Requests from the LCS Client are authenticated based on a combination of a Client ID and password stored in a LCS Client profile at the LSC server (e.g. the GMLC) and authorized based on the "Authorized UE List". That is, the LCS client is authorised to receive location information from the GMLC entity if the requesting user equipment (UE) is found from the list.

LCS clients are typically Application Service Providers (ASP) who are not a part of the PLMN system.

One important issue in Mobile Location Services (MLS) is the subscriber's privacy. In particular the user is able to define only broad privacy requirements which are stored in the home location register HLR. The current privacy requirements allow a user to define whether or not the user's location information can be provided and if so to which clients. Currently these privacy requirements have been handled by Mobile Services Switching Centre (MSC), GMLC, and the mobile terminal based on the information stored in the home location register. For example, Client screening is done in the GMLC (that is clients can request location information via the GMLC network operator) and in the MSC/VLR (that is clients can request for example a user's subscriber's location information) (VLR=Visitor Location Register).

The subscriber specific privacy parameter information is stored in the HLR and copied to VLR, if required. This information is generally called LCS privacy parameters. The problem with the existing system is that it is limited and inflexible.

SUMMARY OF THE INVENTION

Embodiments of the present invention aim to address one or several of the above problems.

According to a first aspect of the invention, there is provided a telecommunications system comprising: at least one user; a first entity for storing information defining a privacy profile for said at least one user; a second entity arranged to store an association between at least one user and said first entity; wherein said system is such that in response to a request for information relating to said user, said association stored in said second entity is used to identify said first entity so that a check can be made with respect to the privacy profile as to whether or not the requested information can be provided.

According to a second aspect of the invention, there is provided a method for controlling the privacy of a user in a telecommunications system comprising the steps of: receiving a request for information relating to said user; obtaining information from a second entity identifying a first entity, said first entity storing information defining a privacy profile for said user; and carrying out a check with respect to the privacy profile as to whether or not the requested information can be provided.

According to a third aspect of the present invention, there is provided an entity for use in a telecommunications system, said entity being arranged to store information defining a privacy profile for at least one user, said privacy profile comprising at least one of the following types of information: information defining time when the information on the user can be provided; information defining time when the information on the user can not be provided; information defining locations of the user when the information on the user can be provided; and information defining locations of the user when the information on the user can not be provided.

According to a further aspect, there is provided a home location register for use in a telecommunication system, said home location register being arranged to store information for a plurality of users identifying for each user an entity, the or each entity being arranged to store a privacy profile for the respective plurality of users.

BRIEF DESCRIPTION OF DRAWINGS

For better understanding of the present invention, and as to how the same may be carried into effect, reference will now be made by way of example to the accompanying drawings in which.

DESCRIPTION OF PREFERRED EMBODIMENTS OF THE INVENTION

Figure 1:
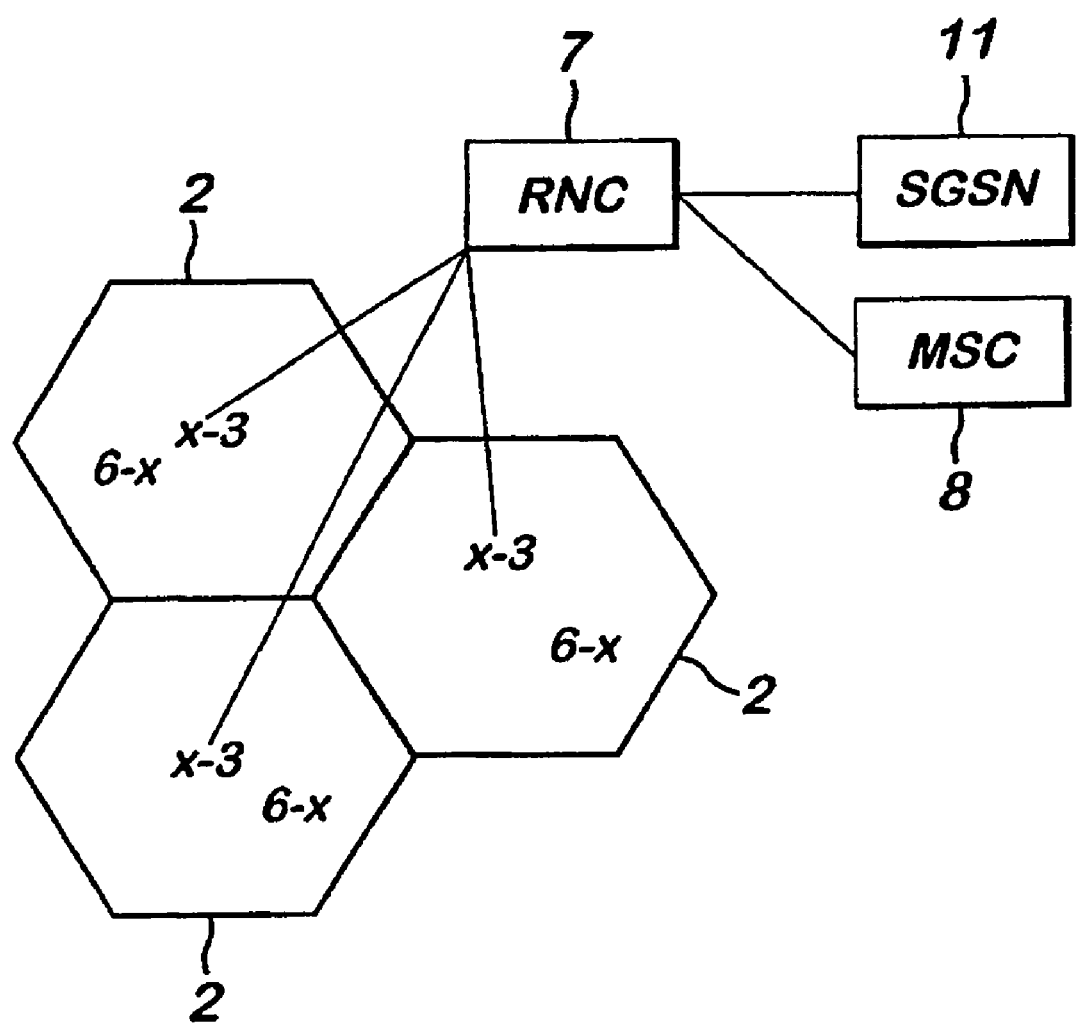
FIG. 1 shows a system in which embodiments of the present invention can be used.

Reference is made to FIG. 1 which is a simplified presentation of a cellular system providing location services. It should be appreciated that even though the exemplifying telecommunications network shown and described in more detail uses the terminology of the third generation (3G) UMTS (Universal Mobile Telecommunications System) public land mobile network (PLMN), the proposed solution can be used in any system providing mobile communications for users and some kind of location information service. Examples of other telecommunications systems include, without limiting to these, standards such as the GSM (Global System for Mobile communications) or various GSM based systems (such as GPRS: General Packet Radio Service), AMPS (American Mobile Phone System) or DAMPS (Digital AMPS), IMT 2000 (International Mobile Telecommunications system 2000), i-phone and so on.

More particularly, FIG. 1 shows an arrangement in which base stations 3 (only three shown for clarity) of the cellular system 1 provide radio coverage areas i.e. cells 2. Each radio coverage area 2 is typically served by a base station. It should be appreciated that one cell may include more than one base station site. A base station apparatus or site may also provide more than one cell. The shape and size of the cells 2 depend on the implementation and may be different from the illustrated shapes. The shape and size of the cells may also vary from cell to cell. It should be appreciated that in some systems the base station may be referred to as Node B.

Two user equipment such as mobile stations (MS) 6 are also shown. It shall be appreciated that typically a number of user equipment will be in communication with each base station. Each base station is arranged to transmit signals to and receive signals from the mobile user equipment (UE) 6 via a wireless interface. Likewise, the user equipment 6 are able to transmit signals to and receive signals from the base stations.

Each of the base stations is connected to an access network controller such as a radio network controller (RNC) 7 of a UMTS terrestrial radio access network (UTRAN) or a base station controller of a GSM type system. The radio network controller may be connected to appropriate core network entities of the cellular system, such as a MSC (mobile switching centre) 8 and/or SGSN (serving general packet radio service support node) 11, via a suitable interface arrangement.

The location of a mobile user equipment may vary in time as the user equipment is free to move within the coverage area of a base station and also from a coverage area to another coverage area. The modern communication systems are capable of providing information regarding the geographical location of a user equipment within the coverage area thereof. The geographical location may be defined on the basis of the position of the mobile station relative to the base station(s) of the mobile telecommunications network.

The geographical location of the user equipment may be defined, for example, in X and Y co-ordinates or in latitudes and longitudes. A possibility is to use the relation between defined radiuses and angles, e.g. based on the spherical coordinate system or alike. It is also possible to define the location of the base stations and/or mobile stations in vertical directions. For example, z co-ordinate may be used when providing the location information in the vertical direction. The vertical location may be needed e.g. in mountainous environments or in cities with tall buildings.

Figure 2:
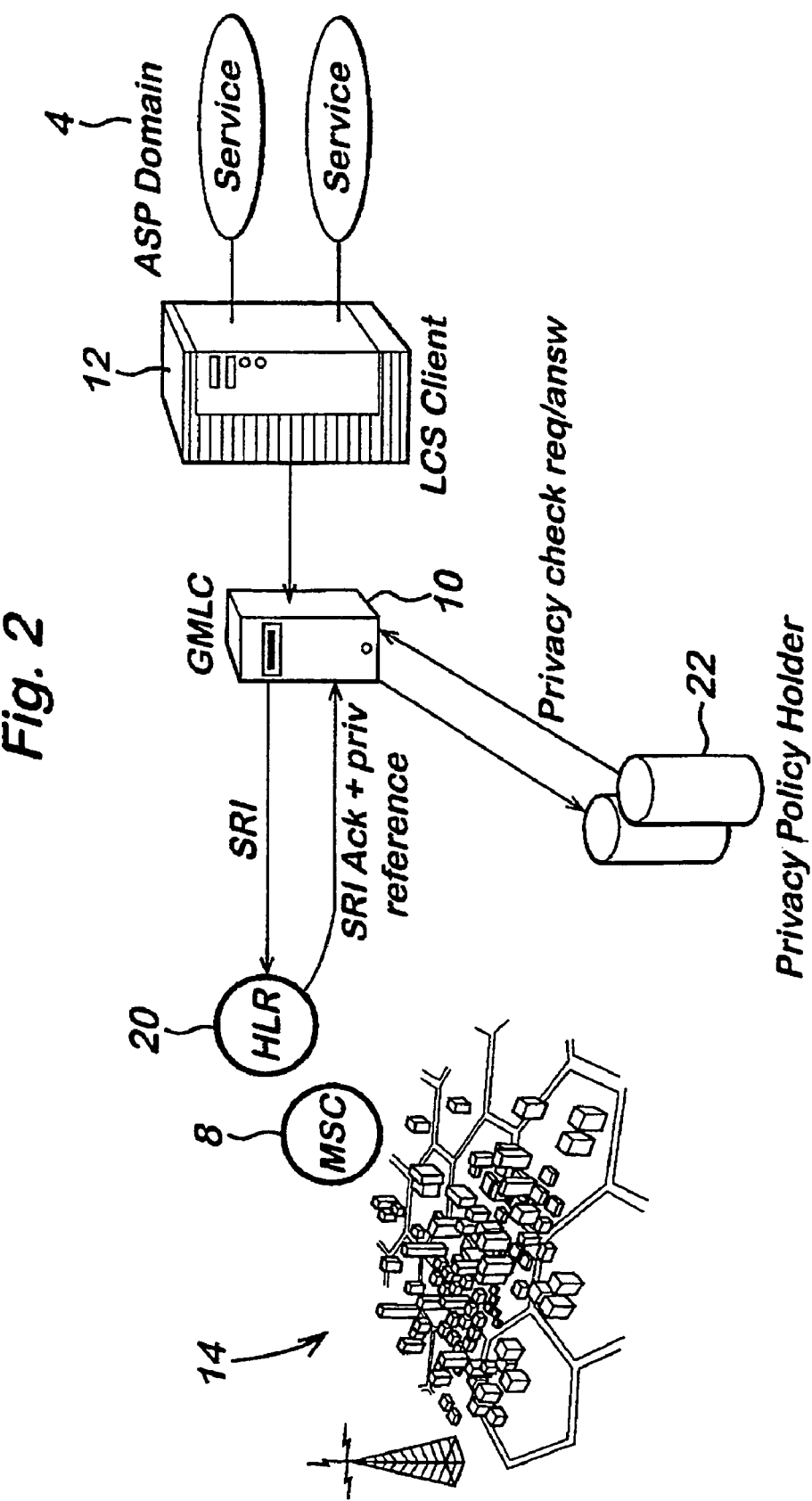
FIG. 2 shows an embodiment of the invention.

Reference is made to FIG. 2 which shows in more detail the location elements of a communications system. The base stations and radio network controllers define a radio access network 14. Different networks have equivalent elements.

The location service (LCS) functionality of the communication system is provided by a Gateway Mobile Location Center (GMLC) entity 10. The GMLC location service node 10 is for gathering and storing data that is required for the provision of the location information. The location service node 10 is arranged to receive via appropriate interface means information concerning the location of the mobile user equipment from the cellular system.

The cellular system may be provided with various different means for processing information gathered from the cells and/or some other parameters and/or for computing by processor means appropriate calculations for determining and outputting the geographical location of the target user equipment. The location information may be obtained by using one or more of the appropriate location techniques. At least a part of the location information may be provided based on information provided by system that is separate from the communication system, such as by means of the Global Positioning System (GPS) or similar. Since there are various possibilities how to implement the location services in the cellular system and since the invention is not dependent on the used location determination technology, these are not be described in any greater detail herein.

In order to be able to separate the user equipment from each other, the location service entity 10 is capable of processing at least one form of identifiers. The identity information may be provided e.g. by means of a mobile subscriber ISDN number (MSISDN), an international mobile subscriber identifier (IMSI) or a temporary identifier (such as a temporary international mobile subscriber identifier: TIMSI) of the mobile user equipment, passwords, or any other form of identifier that can be reliably used for identifying a user equipment and/or a user.

The GMLC server 10 is arranged to receive location information from the radio access network 14 via appropriate controller entities such as the MSC 8 and/or SGSN (not shown) connected by the appropriate interface means to the access network.

The GMLC 10 may provide the location information in a predefined manner to a location services (LCS) client 12. A LCS Client 12 can be any entity that makes use of the location information. The LCS client 12 can be seen as a logical functional entity that may make a request to the location service entity 10 for the location information of one or more target user equipment. The LCS client 12 may be an entity that is external to the communication network, the client entity 12 being provided in an ASP domain 4. Examples of an ASP are Yahoo and Aktivist. The LCS client may also be an internal client (ILCS) i.e. reside in any entity or node (including the mobile station) within the communication system 1.

The LCS clients are entitled to receive at least some degree of information concerning the location (or location history) of a target user equipment. The particular requirements and characteristics of a LCS Client are typically known to the location service server of the communication system by its LCS client subscription profile. This is discussed in more detail hereinafter.

The GMLC 10 may consist of components and bearers needed to serve the LCS client 12. The GMLC 10 may provide a platform which will enable the support of location based services in parallel with other telecommunication services such as speech, data, messaging, other teleservices, user applications and supplementary services. The GMLC 10 may thus provide the client 12, on request or periodically, the current or most recent geographic location (if available) of the target user equipment or, if the location fails, an error indication and optionally the reason for the failure. A more detailed description of a LCS entity that may be employed in the embodiments of the invention can be found e.g. from the above referenced 3GPP technical specification No. 3GPP TS23.271.

A home location register 20 is provided. The home location register may store the same privacy parameters which are currently proposed. Alternatively or additionally, the home location register will store the address of an entity which stores privacy parameters for the user. In preferred embodiments of the present invention, the home location register does not include any privacy parameters. Rather, they are stored in the separate privacy entity referenced 22 in FIG. 2. In particular, the home location register 8 is arranged to include a privacy reference address for each subscriber allocated for location services. This address is, in the described embodiment, for example the GT (global title) or the IP (internet protocol) address or any other suitable address of the privacy policy holder entity 22. This entity 22 may take the form of a server.

The privacy policy entity 22 can be provided internally or externally of the operator's network. Access to the privacy policy entity 22 can be via an IP or SS7 based connection or by any other suitable type of connection.

The privacy policy entity 22 can store a detailed privacy policy for a user. For example, the privacy policy entity can store information relating to firstly whether or not the location of the user can be provided to an LCS client. If so, the times when the location of the user can be provided to the client can also be defined. The privacy policy entity 22 can also store information defining those clients to which location information can be sent. The user can also define locations for example the user's home and/or office environment, in which the location of the user cannot be provided to a location client. The information stored can be in any suitable format. For example, the times when the location of the user can be sent to a client can be stored and/or the times when information cannot be sent to the client can be stored. Likewise, information can be stored defining the area in which when the user is located, information cannot be sent to the user or vice versa. The privacy policy entity 22 may also store information defining how accurate the location information may be for an LCS client, for example some LCS clients may only be able to obtain ID/Service area based location information. The privacy policy entity stores information as to who is the owner of the policy (profile) for each subscriber and who is authorised to manage the settings. Communities can be introduced for a subscriber or global communities can be defined which subscribers can join. These communities can have certain privacy rules separately set by the community owner.

As a separate entity is provided for storing the privacy profile for a user, the profile can be as detailed as required. For example, the privacy holder entity may store information which indicates that the location of the user can only be provided with the explicit consent of a user. In this case the verification may be required from the user before accepting the original location request from the client/ASP and completing the privacy check. If a subscriber has set that notification is needed in the privacy rules then the privacy policy entity should request notification additionally while making the privacy check. The privacy profile entity can be in separate network element. In some embodiments the functionality of the privacy policy entity can be added to another network element e.g. GMLC.

Figure 3:
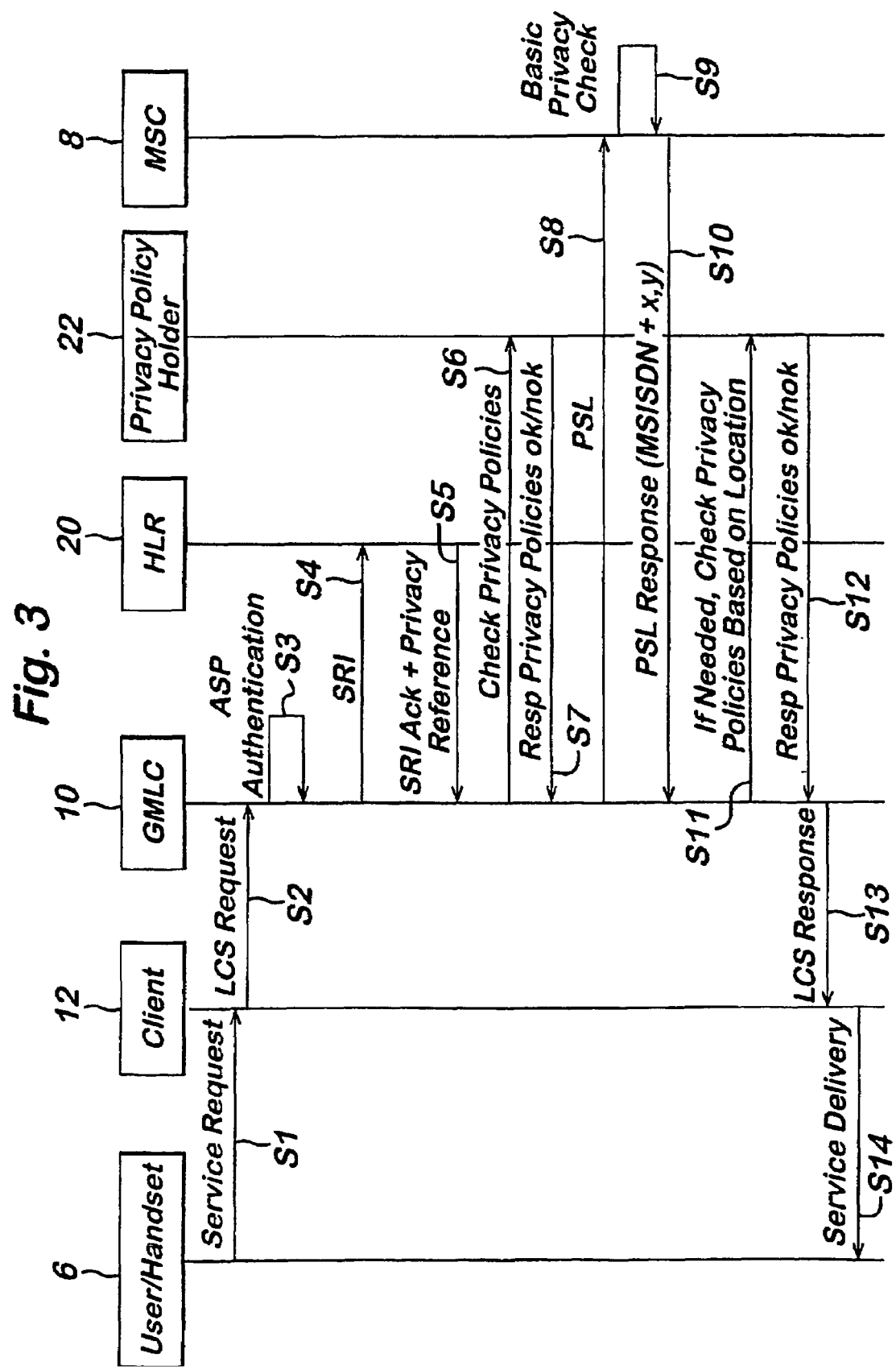
FIG. 3 shows a method embodying the present invention.

Reference is made to FIG. 3 which illustrates the method embodying the present invention. In step S1, a user sends a service request message to the client 12. The client 12 sends a location request, in step S2, to the GMLC. The GMLC in step S3 authenticates the LCS client. If that authentication is successful, an SRI (send routing information) is sent in step S4 to the user's home location register 20. The SRI message requests the details of the MSC/SGSN in which a subscriber is currently located. The home location register 20 in step S5 acknowledges the request and provides the address or identification information for the privacy policy entity 22. The home location register also provides the current MSC/SGSN address. This acknowledgement and identification information is sent to the GMLC 10. The GMLC, in step S6 sends a request to the entity to check whether the location request received from the client can be actioned. In this request all the available information is passed which can for example be the Client ID, requester, MSID, QoS, request type (i.e. immediate, periodic) etc. The privacy policy entity 22 will take into account the parameters defined by the user and see whether or not the location request from the particular location client 12 is allowable in view of that profile. The privacy policy entity sends, in step S7, a reply to the GMLC 10 indicating whether or not location information on the user can be provided. In that reply there may also be information as to whether notification or privacy verification is needed to send to MS/UE. It should be appreciated that at this point, the location of the user is not identified and as such, no check is made with respect to any location part of the defined profile. This is because the level of location information available in this point is only the MSC identity and/or the last known location of the subscriber. If this is the accepted level of accuracy defined then the location dependent privacy check can be performed also in this stage. Otherwise the location check is not made in this stage.

In step S8, if it is determined that the privacy policy entity 22 has not provided a negative reply, a PSL (provider subscriber location) message is sent to the MSC/SGSN 8. In this message it could be indicated that privacy check is already done by GMLC or the privacy override indicator (POI) that is already defined in current standards is used. Here the new privacy check performed indication is preferred. This would result that MSC/SGSN may not perform the privacy check. The PSL message could also include the information whether notification or verification is needed or not. If the PSL message does not include this information, the GMLC should use the client identity that specifies if this to be done. In current standards the system does not do verification or notification if the POI is used. So in the case that the privacy check indication is not received or POI not set, in step S9, the MSC 8 carries out a basic privacy check as defined in 3GPP TS 23.271 chapter 9.5.

In step S10, a response is sent by the MSC to the GMLC which provides the MSISDN of the user and its location.

If necessary, the further check is made to see whether or not the location of the user rules out that information being provided to the client. To do this, the location information may be sent by the GMLC to the privacy policy entity 22 in step S11. That will check the location of the user against the defined areas. The privacy policy entity 22 will send a reply to the GMLC which will indicate whether or not it is acceptable for the client to be provided with the location of the user. This takes place in step S12. If it is determined that the client can be provided with the user's location, the next step is step S13 where the GMLC provides the client 12 with the location of the user. The client 12 then, in step S14, provides the user with the required information.

In some arrangements, some GMLCs or the like may not support the use of the privacy policy entity. Accordingly, for these GMLCs steps S6 and S7 may be omitted and replaced by an additional step which would send the privacy check request after step S8. This additional step may be part of step S9. In the case that the GMLC or the like does not support the use of the privacy policy entity, a different entity such as the MSC could send the privacy check request on behalf of the GMLC.

If the user visits another network, then the address or the like of the privacy policy entity should be copied to the VLR of the visited network.

In one embodiment of the present invention, the HLR can in response to a service request provide the GMLC with the address or the like of the privacy policy entity. The GMLC can then communicate with the privacy policy entity. In alternative embodiments of the present invention, the HLR may be arranged to communicate with the privacy policy entity 22. For example, the SRI request would be received by the home location register 20. In response to that request the home location register 20 would carry out the required privacy check by communicating with the privacy policy entity 22 directly.

It should be appreciated that depending on the user's privacy profile, more information may be required by the privacy policy entity 22 for indicating whether a location request is or is not allowable. For example, the identity of the client may be required, the location of the user may be required etc. In those circumstances, the privacy policy entity would need to receive further information. In those circumstances, the privacy policy entity would send a reply indicating that the further information would be required before a decision could be given.

In preferred embodiments of the present invention, the GMLC has been described as sending the privacy check requests. However, in alternative embodiments of the present invention, other entities may provide that request, for example, the SGSN or MSC or indeed any other suitable entity.

Figure 4:
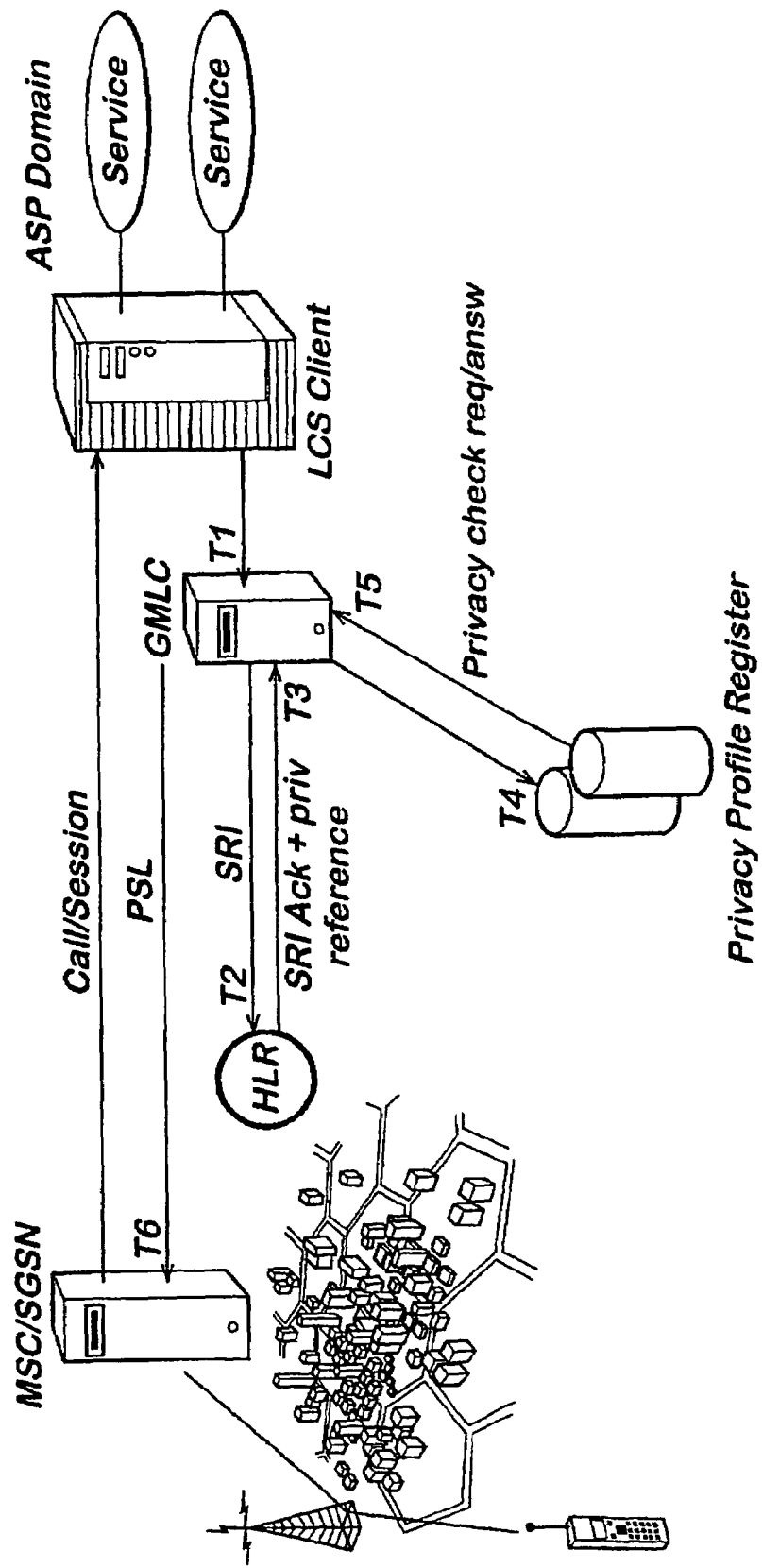
FIG. 4 illustrates a modified version of the method of FIG. 3.

Reference is made to FIG. 4 which illustrates a modification to the method shown in FIG. 3. The method illustrated in relation to FIG. 4 is arranged so as to take into account whether the location request is in response to a location request from the user. In particular, the user may initiate a call or session and request a location based service from an LCS client. If the user has requested a location related service, there is no privacy problem in supplying the location information from the user to the LCS client. However, if the user is to, for example, to be provided with an advertisement dependent on the location of the user, this would have to take into account the profile stored in the privacy profile register.

In step T1, the LCS client sends a request to the GMLC. This corresponds to step S2 in FIG. 3. In step T2, an SRI (send routing information) message is sent to the user's home location register 22. This is the same as step S4 in FIG. 3. It should be appreciated that the GMLC may also carry out authentication procedure as in the method illustrated in FIG. 3. Step T3 is the same as step S5 of FIG. 3. In step T4, the GMLC sends a request to the entity to check whether the location request received from the client can be actioned. Again, is the same or similar to step S6.

In step T5, the privacy profile register 22 provides two responses. One response is call/session related. That is, the response indicating whether or not location information on the user can be provided will take into account the fact that the user has requested the particular location service. However, there may be, for example, bars on the user's subscription which prevent the user from obtaining a particular location service. The second result assumes that the user has not initiated a call/session. It may well be that the call/session related response and the call/session unrelated response may be different or the same.

In step T6, the GMLC 10 sends the provide subscriber location message to the MSC or SGSN, depending on the network. This message can contain two results, one call/session related and second call/session unrelated. Depending on whether or not the user has initiated the call/session, one of the two responses from the privacy profile holder 22 will be used. The remaining steps of FIG. 4 would be the same as steps S10 to S14 of FIG. 3, taking into account the appropriate response from the privacy profile register 22.

In one modification to the embodiment of the present invention, the GMLC may have already received information either from the MSC/SGSN directly or, for example from the LCS client indicating whether or not there is a call/session in place. If so, the GMLC request in step T4 would specify whether or not there was a call/session in place. The privacy profile register would then need only to provide a single response.

In one modification to the embodiment of the present invention, the GMLC may receive information in the provide subscriber location response message either from the MSC/SGSN indicating whether or not there is a call/session, in place. The GMLC can forward this information and the location information to the privacy profile register before sending the LCS response to the LCS client as in step S13. Based on call/session information and location information the privacy profile register can reject or approve the location request.

In yet another embodiment of the present invention, the response from the privacy profile register could instead be sent directly to the MSC/SGSN and not to the GMLC entity.

One further modification to the present invention will now be described. A concept called anonymous target subscriber has been proposed in the context of the location request procedure. In this concept the target subscriber can hide his true identity from LCS client (application). In this case the LCS service request is send from the LCS client to the LCS server (GMLC) containing only the pseudonym of the target subscriber. In one preferred modification to the present invention, it is possible for the target subscriber to allow only location requests where the true identity of the target subscriber is hidden from the LCS client. The target subscriber can be kept anonymous from the LCS client when the LSC service request only contains the pseudonym of the target subscriber.

Embodiments of the present invention may be such that the subscriber can be sure that only location requests where the true identity of the subscriber is hidden shall be allowed. In an embodiment of the present invention, the target subscriber is able to use this anonymity as a part of his privacy profile, as discussed previously and to be used in the privacy check.

This embodiment enhances the subscriber's privacy.

In the 3GPP Rel-6 the privacy check for the location request is made in the Home PLMN either in the Home GMLC or in the privacy policy holder. This would mean that when this anonymous target subscriber concept is used, the H-GMLC or privacy policy holder should get the corresponding information when the anonymous LCS service request is send from the LCS client, This information can be used in the privacy check. Also the subscribers LCS privacy profile kept in the H-GMLC/PPR shall contain this new information that only anonymous location requests are allowed by that user and optionally the circumstances in which the anonymous location request are required and when they are not required.

Reference is made to the two third generation specifications LSC3GPP TS 23.071 and LCS 3GPP TS 23.271 which currently define location requests.

Embodiments of the present invention have been described in the context of privacy relating to location services. However, it should be appreciated that alternative embodiments of the present invention can be used with additional or alternative services such as presence services and other services which contain information about the subscriber, e.g. dating services. It should also be appreciated that general and specific information regarding the user, the subscriber, the client, ASP or service may be stored in the profile data base. Thus the information stored in the entity may define a user profile, a subscriber profile, a client profile, an ASP profile or a service profile, these profiles may or may not include privacy information. Where the information relates to the client, the ASP or the service, there may be no information or there may be information relating to a subscriber or a user.

It should be appreciated that when the user 3 roams to a different network, the so-called "visited network", the information associated with that user is copied from the home location register 20 to the visitor location register of the visited network. The check as to whether or not the user can receive the information is made in a MSC of the visited network using the information temporarily stored in the VLR. The visited network may access the privacy entity 22.

Whilst the invention has been particularly described herein with reference to MSCs and VLRS, the invention is not limited to such and applies equally, for example to GPRS arrangements and consequently SGSNs.

It should be appreciated that whilst embodiments of the present invention have been described in relation to user equipment such as mobile stations, embodiments of the present invention are applicable to any other suitable type of user equipment.

The entity which stores the address of the privacy entity is described in preferred embodiments of the invention as being the HLR but in alternative embodiments of the invention can be provided in user equipment, mobile services switching centre or a mobile station. The entity making the location request or the like is preferably the GMLC, SGSN or MSC but may in alternative embodiments be the HLR, mobile station or, user equipment. The privacy entity may be a server, user equipment or mobile station.

The embodiment of the present invention has been described in the context of a third generation communication system. This invention is also applicable to any other communication system.

It is also noted herein that while the above describes exemplifying embodiments of the invention, there are several variations and modifications which may be made to the disclosed solution without departing from the scope of the present invention as defined in the appended claims.

The invention claimed is:

1. A telecommunications system, comprising:
   at least one user equipment;
   a privacy policy holder configured to store information defining a privacy profile for at least one user associated with said at least one user equipment; and
   a home location register configured to store the address of the privacy policy holder and an association between said at least one user and said privacy policy holder,
   wherein at least part of said stored information defining said privacy profile is additional to information stored on said home location register, wherein said system is configured so that in response to a request for information relating to said user, said association stored in said home location register is used to identify said privacy policy holder so that a determination can be made by said privacy policy holder with respect to the privacy profile as to whether or not the requested location information can be provided.

2. The system as claimed in claim 1, further comprising:
a third entity configured to receive said request for information.

3. The system as claimed in claim 2, wherein said third entity comprises at least one of a gateway mobile location center, a serving general packet radio service support node, a home location register, a user equipment, a mobile station, or a mobile switching center.

4. The system as claimed in claim 2, wherein said third entity is configured to obtain from the home location register information identifying the privacy policy holder.

5. The system as claimed in claim 2, wherein said third entity is configured to communicate with said privacy policy holder so that it can be determined whether the requested information can be provided.

6. The system as claimed in claim 1, wherein said home location register is configured to communicate with said privacy policy holder to determine whether the requested information can be provided.

7. The system as claimed in claim 1, wherein said privacy profile comprises at least one of the following: information defining time when the information on the user can be provided, information defining time when the information on the user can not be provided, information defining locations of the user when the information on the user can be provided, information defining locations of the user when the information on the user can not be provided, information defining that the identity of said user is to be hidden, information defining when and/or in what circumstances that the identity of the user is to be hidden, information defining entities to which information can be provided, or information defining entities to which information can not be provided.

8. The system as claimed in claim 1, wherein said request for information comprises a location request.

9. The system as claimed in claim 1, wherein said request for information is configured to be received from a further entity external to said system.

10. The system as claimed in claim 1, wherein said request for information is configured to be received from a further entity in said system.

11. The system as claimed in claim 9, wherein said further entity comprises a service provider.

12. The system as claimed in claim 1, wherein said privacy policy holder comprises at least one of a server, a mobile station, or a user equipment.

13. The system as claimed in claim 1, wherein said at least one user is a user equipment.

14. The system as claimed in claim 13, wherein said at least one user is a mobile station.

15. The system as claimed in claim 1, wherein said privacy policy holder is configured to carry out, when the privacy policy holder requires further information to carry out said determination, a further determination of whether said further information is available.

16. The system as claimed in claim 1, wherein said privacy policy holder is configured to provide first information and second information, said first information being usable when there is a call/session and second information being usable when there is no call/session.

17. The system as claimed in claim 16, wherein said first information is usable when there is a call/session related to a location request and said second information is usable when there is no call/session related to a location request.

18. The system as claimed in claim 2, wherein said privacy policy holder is configured to provide first information and second information, said first information being usable when there is a call/session and second information being useable when there is no call/session and wherein said first information and second information are configured to be sent to said third entity.

19. The system as claimed in claim 1, wherein said privacy policy holder is configured to receive information indicating whether there is a call/session and to provide information depending on whether there is a call/session.

20. The system as claimed in claim 19, wherein said information is configured to indicate whether there is a call/session related to a location request.

21. The system as claimed in claim 19, wherein said privacy policy holder is configured to receive information indicating whether there is a call/session from a mobile switching center, a serving general packet radio support node, or a gateway mobile location center.

22. The system as claimed in claim 19, wherein said privacy policy holder is configured to receive location information and the information relating to said call/session after a positioning procedure has been carried out.

23. The system as claimed in claim 22, wherein, based on the location information and/or the information relating to the call/session, the privacy policy holder is configured to reject or approve the location request.

24. The system as claimed in claim 1, wherein the requested information is configured to be provided without providing the identity of the user.

25. The system as claimed in claim 1, wherein the requested information is configured to be provided with a pseudonym of said user.

26. A method, comprising:
controlling the privacy of a user in a telecommunications system;
receiving a request for information relating to said user;
obtaining an address from a home location register identifying a privacy policy holder, said privacy policy holder storing information defining a privacy profile for said user wherein at least part of said stored information defining said privacy profile is additional to information stored on said home location register; and
carrying out a determination at said privacy policy holder with respect to the privacy profile as to whether or not the requested location information can be provided.

27. A home location register, configured to:
operate in a telecommunication system;
store information for a plurality of users identifying for each user a privacy policy holder, the or each privacy policy holder being configured to store information defining a privacy profile for the respective plurality of users,
wherein at least part of said stored information defining said privacy profile is additional to information stored on said home location register, and
wherein the home location register is configured so that in response to a request for information relating to said user, said association comprising the address of the privacy policy holder stored in said home location register is used to identify said privacy policy holder so that a determination can be made by said privacy policy holder with respect to the privacy profile as to whether or not the requested location information can be provided.

28. The home location register as claimed in claim 27, wherein said home location register is configured to store for said plurality of users an address of the privacy policy holder storing the privacy profile for the respective user.

29. A telecommunications system, comprising:
   at least one user equipment;
   a privacy policy holder configured to store a privacy profile comprising information relevant for or related to at least one user associated with said at least one user equipment; and
   a home location register configured to store the address of the privacy policy holder and an association between said at least one user and said privacy policy holder,
   wherein at least part of said stored information on said privacy policy holder is additional to information stored on said home location register, and
   wherein, when there is a request relating to or from said user, said system is configured so that said association stored in said home location register is used to identify said privacy policy holder so that a determination can be made by said privacy policy holder with respect to the stored location information to provide a response in dependence on said stored information to said request.

30. A telecommunications system, comprising:
   at least one user equipment;
   a home location register configured to store a privacy policy comprising information defining a first profile for at least one user associated with said at least one user equipment; and
   a privacy policy holder configured to store information defining a privacy profile for said at least one user,
   wherein said first profile comprises an address of the privacy policy holder and an association between said user and said privacy policy holder,
   wherein at least part of said stored information defining said privacy profile is additional to information stored in said first profile, and
   wherein said system is configured such that in response to a request for information relating to said user, said association in said first profile is used to identify said privacy policy holder so that a determination can be made by said privacy policy holder with respect to the privacy profile as to whether or not the requested location information can be provided.

31. The system as claimed in claim 30, further comprising:
   a third entity configured to store a copy of said first profile stored on said home location register,
   wherein in response to a request for information relating to said user, the association in said first profile stored on said further entity is configured to be used to identify said privacy policy holder storing said information defining said privacy profile.

32. A telecommunications system, comprising:
   at least one user equipment means for equipping a user;
   a first storage means for storing information defining a privacy profile for at least one user associated with said at least one user equipment means; and
   a second storage means for storing an association between said at least one user and said first storage means and an address of a privacy policy holder,
   wherein at least part of said stored information defining said privacy profile is additional to information stored on said second storage means,
   wherein said system is configured so that in response to a request for information relating to said user, said association stored in said second storage means is used to identify said first storage means so that a determination can be made by said first storage means with respect to the privacy profile as to whether or not the requested information can be provided.

* * * * *